(12) United States Patent
Syed et al.

(10) Patent No.: US 8,060,648 B2
(45) Date of Patent: Nov. 15, 2011

(54) METHOD AND SYSTEM OF ALLOCATING DATA FOR SUBSEQUENT RETRIEVAL

(75) Inventors: Yasser F. Syed, Boulder, CO (US); Terry D. Shaw, Broomfield, CO (US); David P. Reed, Boulder, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 1618 days.

(21) Appl. No.: 11/216,500

(22) Filed: Aug. 31, 2005

(65) Prior Publication Data

US 2007/0050590 A1      Mar. 1, 2007

(51) Int. Cl.
*G06F 13/00* (2006.01)
(52) U.S. Cl. .................. 709/236; 709/232; 709/231
(58) Field of Classification Search .................. 709/231, 709/232, 236
See application file for complete search history.

(56) References Cited

U.S. PATENT DOCUMENTS

| 7,191,215 | B2* | 3/2007 | Ganesan et al. ............... 709/204 |
| 2003/0204856 | A1 | 10/2003 | Buxton |
| 2004/0030990 | A1* | 2/2004 | Kobayashi et al. ......... 715/500.1 |
| 2006/0184688 | A1* | 8/2006 | Ganguly et al. .............. 709/232 |
| 2007/0016619 | A1* | 1/2007 | Suriyanarayanan et al. . 707/200 |
| 2008/0034108 | A1* | 2/2008 | Chapweske ................... 709/234 |

\* cited by examiner

*Primary Examiner* — Kenneth R Coulter
(74) *Attorney, Agent, or Firm* — Brooks Kushman P.C.

(57) ABSTRACT

A method and system of allocating data for subsequent retrieval. The method and system optionally including allocating data to a plurality of devices for storage, associating the data with the device providing the storage thereof, and providing retrieval information to facilitate retrieval of the data as function of the devices associated with the storage thereof. The method and system may further include features for controlling information associated with the allocated and/or features for associated one or more pieces of metadata to control access to allocated data once retrieved.

40 Claims, 2 Drawing Sheets

_Fig-1_

_Fig-2_

Fig-3

METHOD AND SYSTEM OF ALLOCATING DATA FOR SUBSEQUENT RETRIEVAL

BACKGROUND OF THE INVENTION

1. Field of the Invention

The present invention relates to methods and systems of allocating data for subsequent retrieval.

2. Background Art

Peer-to-peer (P2P) file-sharing technologies may be grouped into categories based on the methods used for content identification, caching, and delivery. A first category of P2P technology may be characterized by a central index showing the locations (IP address) of content files shared on a segment of the network. When a data source is identified, a direct transfer of the entire file from one peer to another is facilitated by the network software.

A second category of P2P technology may be characterized by the content indices being distributed among a group of interconnected "super nodes" on the network. Often, an Internet subscriber hosting a super node on his/her computer would be unaware of it. Similar to the first generation P2P technology, when a data source is identified, a direct transfer of the entire file from one peer to another is facilitated by the network software. Many of the P2P applications currently in use (in particular those based on the so-called "FastTrack" protocol) are of this type.

Media on demand (MOD) systems may be characterized by centralized storage and one-to-one downstream transport. In a typical media distribution system, such as a video-on-demand system or music download service, the files may be distributed to individual subscribers from a centralized file-server (centralized storage). The file-server may be located on the cable operator's internal network (upstream from the video headend or CMTS) or network backbone. When a customer desires a media selection, the media may be routed from the file server to the subscriber via the CMTS or video headend. Thus the "last mile" transport burden is placed entirely on the downstream channel (one-to-one transport).

P2P systems may be characterized by media storage on subscriber devices connected to the access network. First and second generation technologies mimic the conventional MOD architecture on a small scale with files being served from a subscriber's home computer. In order to be transferred to another broadband user anywhere on the Internet, a file must be uploaded from the source subscriber's computer over the access network, transit the Internet, and be downloaded over the access network to the downloading subscriber. This may place a heavy burden on the upstream access network exacerbated by one-to-one content delivery. Connection times used by first and second generation P2P systems can be of long duration, sometimes persisting for days on an unmonitored computer running a P2P application. For example, if a high-speed data subscriber is provisioned with a 500 Kbps upstream data rate, it would take nearly 4.5 hours to transfer a 1 Gbyte media file to another subscriber.

SUMMARY OF THE INVENTION

One aspect of the present invention relates to a method of allocating data storage in a cable system having a plurality devices distributed over a common network. The devices may be associated with services provided by a cable operator of the cable system. The method may include allocating data to a plurality of devices for storage, associating the data with the device providing the storage thereof, and providing retrieval information to facilitate retrieval of the data as function of the devices associated with the storage thereof.

The method may include segmenting a content group for storage as data on the devices and providing retrieval information to facilitate retrieval of the content group from the stored data. This may further include associating the content group with a media file having media suitable for playback such that the media file is segmented into data which may be retrieved to support the playback thereof.

The method may include associating the content group with a device configuration file associated with configuring the operation of one or more of the devices so that the devices may retrieve the data associated with the device configuration file to configure at least a portion of the operation thereof.

The method may include associating advertisements with the retrieved data such that usage of the retrieved data includes usage of the advertisements. A user interface may be provided for use in selecting one or more advertisements for association with the data. Optionally, customers may be charged for use of the data as a function of a number of advertisements selected for association therewith.

The method may include providing selective information that is required for use of the retrieved data. The selective information may include metadata, such as for associating the retrieved data with at least one of a list of chapters, a list of insertion points, a playlist, a link to games, a promotional offer, a link to a chatroom, and/or a time-sensitive offer. Optionally, information may be included within the metadata for directing retrieval of the data as a function of a playback sequence associated with the media.

One aspect of the present invention relates to a method of distributing multimedia in a cable system. The method may include segmenting the multimedia into a number of data elements for storage on a number of cable devices used in providing cable services to customers and configuring a controller to facilitate swarming of the data elements from the cable devices to a requesting device.

The method may include configuring the controller to allocate the data elements to the cable devices as a function of available storage capacity of the cable devices, such as based on signals outputted from the devices to the controller for indicating available storage capacity.

Optionally, the method may include configuring the cable devices to prevent customer usage of a portion of the available storage capacity, such as based on contractual commits subscribed to by a customer associated therewith.

One aspect of the present invention relates to a controller for use in a cable system to coordinate storage of content on a number of cable devices used to support the cable services. The controller may include instructions for segmenting the content into a number of individual pieces of data, distributing the individual pieces of data to the cable devices, associating the distributed pieces of data with the cable devices providing the storage, and facilitating retrieval of the content from the distributed pieces of data.

The controller may include instructions for associating selective information with the distributed pieces of data. The selective information may include one or more pieces of metadata, such as to associate the retrieved data with at least one of a list of chapters, a list of insertion points, a playlist, a link to games, a promotional offer, a link to a chatroom, and/or a time-sensitive offer. Optionally, the metadata may include information for directing retrieval of the data as a function of a playback sequence associated with the media.

The above features and advantages, along with other features and advantages of the present invention, are readily

DETAILED DESCRIPTION OF THE INVENTION

Figure 1:
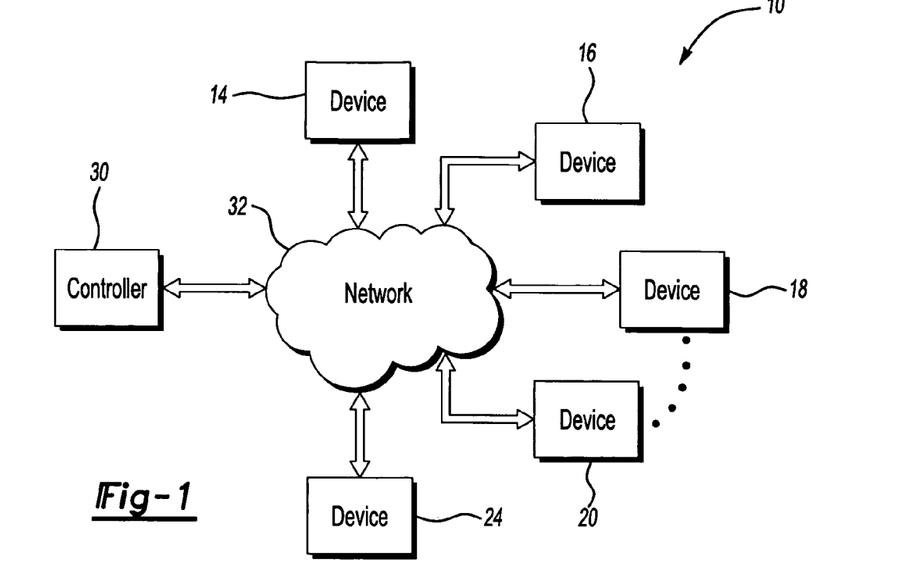
FIG. 1 illustrates a system in accordance with one non-limiting aspect of the present invention.

FIG. 1 illustrates a system 10 in accordance with one non-limiting aspect of the present invention. The system 10 may relate to any number of environments where signals are transmitted between a plurality of electronic devices 14-24. The system 10 may include a controller 30 and a network 32 to respectively facilitate control and delivery of the signals.

For exemplary purposes, the present invention is described with respect to the system 10 being configured to support signal communications associated with cable operations. Of course, the present invention is not intended to be so limited and contemplates its application in any number of environments.

With respect to the exemplary cable environment, the controller 30 may be associated with a system (headend) or other feature of a cable service provider to facilitate signal communications between the devices 14-24. It may include a memory (not shown), user interface (not shown), and other features to control, program, and execute the operation thereof.

The network 32 may include any number of features and options to support signal communications between the controller 30 and devices 14-24. The network 32 may include terrestrial and extraterrestrial components and infrastructures. It may include cable lines, telephone lines, and/or satellite or other wireless architectures. The network 32 may be associated with other private and/or public networks, such as the Internet and provider specific private networks.

The devices 14-24 may be associated with any number of electronic devices which receive, communicate, or perform other signal manipulations. For example, a portion of the devices 14-24 may be associated with signal transmission such as, but not limited to, routers, hubs, switches, gateways, conditional access routers (CARs), cable modem terminations systems (CMTSs), network provisioning units (NPUs), a session boarder controller, a media gateway, a media gateway controller, a signaling gateway, a call management server, a presence server, a SIP routing proxy, a SIP proxy/registrar server, a PCMM policy server, a bandwidth on demand server, a streaming server caching proxy, a gaming server, a CDN, a media acquisition server, a provider server, a unified messaging server, a SIP feature server, a OSS/BSS, and a global directory server.

The devices 14-24 may also be associated with customer premise equipment configured to receive, output, and otherwise manipulate cable related signals for use by one or more customers. For example, a portion of the devices 14-24 may be associated with settop boxes (STBs), modems, cable modems (CMs), computers, digital or personal video recorders (DVRs, PVRs), media terminal adapters (MTAs), and/or outlet digital adapters (ODAs).

One or more of the devices 14-24 may include or be configured to include a memory for storing electronic data. The memory may be of a relatively small size to store less data and/or of a relatively large size to store more data. Data may be transmitted to the devices 14-24 for storage on the memories. The stored data may be subsequently retrieved for usage by other devices 14-24 and features associated with the system.

The devices 14-24 may be configured to support storing and transmitting the data. For example, some of the devices 14-24 may be existing features used by a cable operator to support existing cable services. These devices 14-24 may be configured or re-programmed to facilitate storing and transmitting the data. Likewise, some of the devices 14-24 may be new devices that may be configured prior to or in association with being deployed in the system. Of course, the present invention contemplates any number of methods and features to facilitate configuring the devices 14-24 to store and transmit data, regardless of when the devices 14-24 have been deployed for use in the system.

The controller 30, devices 14-24, and network 32 may be configured to operate according to or support the operation of any number of protocols, applications, and procedures, including applications such as, but not limited to, linear and non-linear television programming (cable, satellite, broadcast, etc.), Video on Demand (VOD), interactive television (iTV), interactive gaming, pay-per-view (PPV), and protocols such as Hyper Text Transfer Protocol (HTTP), Dynamic Host Configuration Protocol (DHCP), Syslog, Simple Network Management Protocol (SNMP), Trivial File Transfer Protocol (TFTP), Data Over Cable Service Interface Specification (DOCSIS), Domain Name Server (DNS) applications, DOCSIS Settop Gateway (DSG), out-of-band (OOB) messaging, and others.

As described below in more detail, the foregoing system 10 may be used to facilitate a third generation P2P application where data is transferred from one location to another through so-called swarming applications. These applications may be characterized by a complex distributed caching and delivery architecture. A file may be cached on the network in the form of an index file and content file. The files may be parsed into a large number of chunks, or sub-files and stored on various memories. The index file may provide a "blue print" for assembling chunks into a coherent, usable content file so that a search engine may be used to identify the index file for a particular content file.

After a user downloads the index file, the P2P software may use the index to find, download, and re-assemble the chunks into the desired content. The chunks may be downloaded in parallel (limited by the download speed of the users connection) from a number of different sources. The technology may be well adapted to the distribution of very large files (500+ Mbytes) including content such as video (movies and TV episodes), games, and software. If a downloading subscriber is provisioned with a 6 Mbps downstream connection and all of the uploaders had 500 Kbps upstreams available, then the time to transfer a 1 Gbyte media file would be reduced by a factor of 12 to about 22.25 minutes. If the downloader had a 30 Mbps downstream data rate available, then it would take under 4.5 minutes to download the media file.

Storage in the system 10 may be available from a number of different sources, including consumer-owned PCs connected to the broadband network and hard-disk drives embedded in customer- and operator-owned personal video recorders (PVRs) embedded in digital set-top boxes (STBs). Together, these sources comprise a massive amount of unused storage capacity that is difficult, if not impossible to estimate.

Consumer-grade personal computers and digital STBs with embedded PVRs are currently being shipped with hard drive capacity of 160 Gbytes or more, and many devices 14-24 connected to the network 32 have a substantial amount of free space available. For example, if a network has 1 million devices with 160 Gbyte hard drives and each of these devices has 1% of the storage available for use in the MOD system, then the amount of available storage would be 1,600 terabytes. With efficient encoding, a standard definition movie feature can be stored in 1 Gbyte. Thus, this example storage network would have adequate capacity to store a library of 100,000 feature-length films with 16× redundancy.

Figure 2:
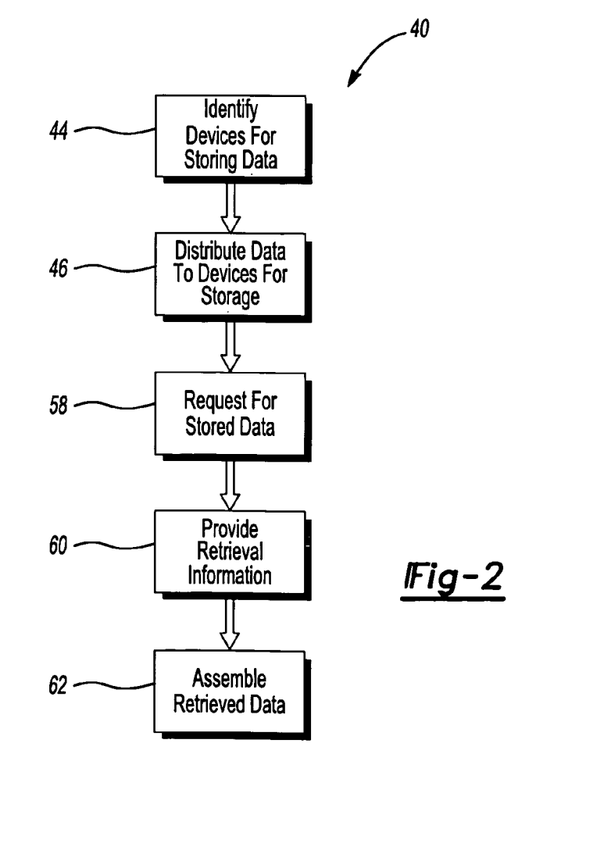
FIG. 2 illustrates a flowchart of a method of allocating data in accordance with one non-limiting aspect of the present invention.

FIG. 2 illustrates a flowchart 40 of a method of allocating data in accordance with one non-limiting aspect of the present invention. The method generally relates to allocating data to one or more of the devices 14-24 for storage and utilizing the controller 30 to facilitate the retrieval thereof. The data, as described below in more detail, may relate to any type of electronic data which may be stored on the devices 14-24 for retrieval, such as media files, configuration files, and the like.

Block 44 relates to identifying one or more of the devices 14-24 for storing data. The devices 14-24 may be configured to register with the controller 30 or other feature associated with the controller 30. This may include providing device configuration information, addressing information, memory information, and other information associated with identifying the devices 14-24 and their capabilities. For example, the device configuration information may identify whether the device is a STB, STB-DVR, router or other feature, the addressing information may indicate how to locate or otherwise communication with the device, and the memory information may indicate the memory storage capabilities of and/or identify data stored on the device.

The devices 14-24 may be requested by the controller 30, programmed, or otherwise configured to periodically update the information associated therewith. This may be advantageous for tracking storage capabilities and to verify the location and accessibility of previously stored data. The present invention contemplates any number of features and configurations for identifying the devices 14-24 and determining their ability to manage, store, and transmit data.

The storage availability of the devices 14-24 may be reserved by a cable operator, such as by building storage allocation requirements into customer service agreement (CSA) issues. The agreements may be used to persuade customers to allocate portions of the memory on their equipment to the system operator for use in the media distribution network 32. This permission may be acquired by making it a part of the CSA governing subscription to the MOD services or other services offered by the provider. Leases and other contractual commitments with the provider or other individuals associated with the system may include similar requirements.

Block 46 relates to distributing data to one or more of the devices 14-24 for storage. The data may be distributed as standalone content and/or segmented content. For example, the data may be associated with a media file, such as a movie, television program, or other video, a configuration file, such as that used to facilitate the operation of one or more of the devices 14-24, or other select groupings of information. Each of the files or groups of files, which are generally referred to as content, may be associated with an indefinable block of information. The content may be stored together on the same device, as in the case of standalone content, and/or segmented into a number of pieces of data for storage on one or more devices 14-24, such as in the case of segmented content.

Other data associated with the content may be included and stored on the devices 14-24. This data may be associated with controlling use of the stored data. For example, an index file may be created to track the devices 14-24 associated with the distributed data. It may comprise a table or other logic suitable for cross-referencing the content with the devices 14-24 storing the data associated therewith. The index file may include assembly instructions for coordinating assembly of the data, which may be advantageous for assembling segmented content where multiple pieces of the content may arrive from multiple locations at varying time intervals such that an order of assembly is needed to assemble the content from the retrieved data. Advantageously, the index file may be used as a key to facilitate retrieval and assembly of the data, as described below in more detail.

A metadata file may be associated with the stored data to facilitate the use thereof. The metadata may include usage limitations on the data. For example, the metadata may require conditional access codes or other security features to prevent unauthorized use of the data. Alternatively, the usage limitations may relate to time-sensitive limitations that specify time limits on usage of the data, such as to provide rental periods and the like.

The metadata may include a list of chapters, a list of insertion points, a playlist, a link to games, a promotional offer, a link to a chatroom, and/or a time-sensitive offer. The list of chapters may be used with media files to indicate different chapters within the file, such as different chapters within a movie or electronic book. The list of insertion points may indicate points within the data where commercials or other features may be inserted, which may be used, for example, with movies to insert advertisements at pre-specified intervals of the movie. The playlist may be used to indicate the order and placements of commercials or other media within the body of the of the content file, i.e., to identify which commercials are to run in the allocated insertion point. The link to a chatroom may be used by a STB, DVR, or other multi-function device to connect the user to a chatroom associated with the data. The link to games may be used by a STB, DVR, or other multi-function device to connect the user to a video game room or other game location associated with the data. The time-sensitive offer may be used to indicate promotions or other offers associated with the data, such as a discount for using the data within a specified time range.

Figure 3:
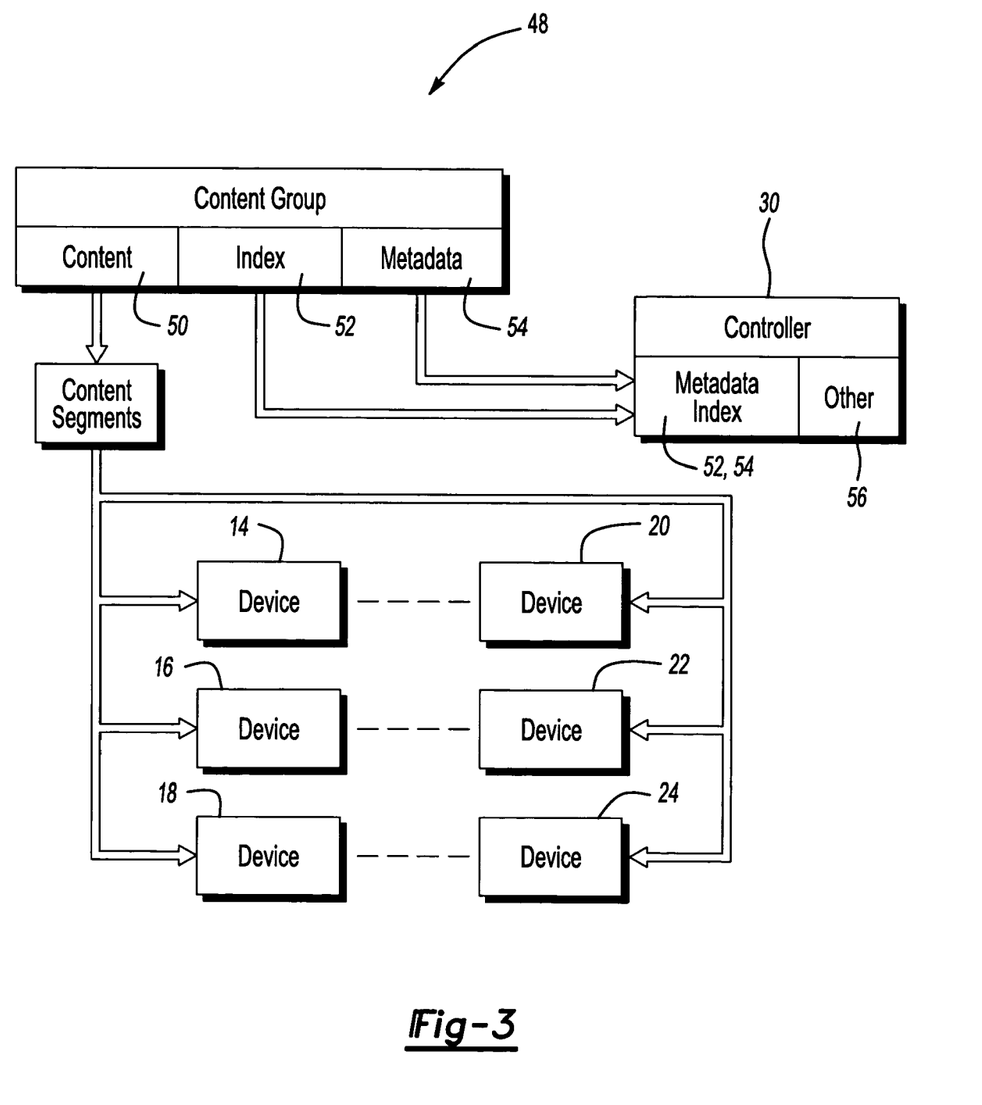
FIG. 3 illustrates segmentation of a content group in accordance with one non-limiting aspect of the present invention.

As shown in FIG. 3, a content group 48 may include three individual files or pieces of data, content 50, index 52, and metadata 54. The content 50 may be segmented into a number of individual pieces of data and dispersed to a number of devices 14-24 for storage. The index 52 and metadata files 54 may be stored on the controller 30, such as to prevent unauthorized access thereto. The controller 30 may include other information 56 associated with controlling and directing the operations thereof, such as a computer readable medium having instructions for directing the operations and functions described with respect to the present invention.

In this manner, individual pieces of data which together comprise the content group 48 may be dispersed to the devices 14-24 and the keys to locating and assembling the data may be held by the controller 30. This may enhance security as the devices 14-24 are likely to be relatively accessible items, such as features found at a customer location or at remote locations in the field, whereas the controller 30 is likely to be relatively inaccessible, such as features found at a headend location or other operation centers of a cable/wireless system operator.

Of course, the content 50 within the content group 48 is not necessarily required to be segmented for storage on multiple devices 14-24, as shown in FIG. 3. Rather, as in the case of the index 52 and metadata files 54, it may be stored as a complete set of content on one of the devices 14-24. Optionally, the controller 30 may include other data for transport with the content 50. For example, the other data may relate to advertisements or other information to be inserted within the content 50, such as during assembly and/or playback.

If the content 50 is associated with a media file, such as a movie, audio program, or the like, the metadata file 54 and/or triggers in the content itself may be used to coordinate advertisement insertion during the playback thereof. The advertisements are shown to be stored as other data on the controller 30, however, they may be similarly stored on one or more of the devices 14-24. The controller 30 may include references or other features within the index 52 and metadata files 54 to respectively facilitate retrieval and playback of the advertisements.

Optionally, the controller 30 may track the number of advertisements included within the retrieved data, such as for billing and tracking purposes. For example, advertisers may be billed as a function of the number of times that their advertisement is downloaded and/or viewed. Likewise, customers may request advertisement insertion within the retrieved data to limit charges associated with the user thereof. In more detail, the system provider may grant price breaks and discounts to customers willing to permit commercials, pop-up windows, and other advertisements to be shown during usage of the data, such as during playback of a video ordered on demand.

This advertising based model may use commercials as a form of currency to purchase data. Viewers can search and download their own choice of commercial content through a separate distribution mechanism such as a Peer-to-Peer distribution network 32. Viewers can then use their acquired commercials to purchase VOD content, for example. Once VOD content is selected, a playlist inserts their commercials into the movie through a client-side mechanism using predetermined index points in the VOD content. Commercial content may be configured to be valid for a limited period of time through a digital rights process held by the service provider. In this manner, the present invention provides an advertising model that is successful in broadcast material, but adapts to a VOD model through the use of file downloading mechanisms and using commercial content as a form of currency to purchase VOD material.

The present invention may provide an alternative mechanism for providing advertising-support of the VOD content. Commercials can be exchanged in a P2P network rather simply and quickly because of their small size. Commercials do not have to be protected like other video content because they are meant to be seen as much as possible. However, no one wants to download commercials. This invention proposes to add value to downloading commercials by making it a form of currency to buy video-on-demand content from a service provider. The customer would download commercials from a P2P network or through the sponsor's website with a value and time window allotted to the commercial. These commercials can be downloaded to the user's PC or STB (w/hardrive).

Once a sufficient number of advertisements are downloaded and/or viewed, the user may then apply to buy a VOD selection using the commercial value he has acquired. A rights verification mechanism checks if the downloaded commercials are valid. Once this is done, the service provider streams the VOD content along with a playlist that plays the commercials at predetermined index point in the movie content. This technology can take advantage of client side mechanisms to insert commercials into the VOD movie. The commercials themselves need to be validated based on some sort of rights rules that effectively limits it to a time window or a number of views, which may be enforced at the client-side rather than the service provider's side. The backend transaction may be completed when the commercial sponsor reimburses the VOD content provider for carriage of the video to the subscriber which could also allow for a commercial reporting mechanism.

The data may also relate to non-media data, such as configuration files or other files associated with operating one or more of the devices 14-24. The system may be used with this data to create a virtual file-sharing network. (Some examples of such ensembles of devices are collections of all cable modems, digital settop boxes, DSL modems, wireless modems, or network routers of a particular type.) In order to share configuration or other data files (such as a code update or patch) to these devices, the operator or operator's agent (e.g. a device manufacturer) may broadcast a message to all members of a particular network to search for the media and provide a single seed file of the media to be disseminated. The seed file is then downloaded to one or more selected members of the network 32 and the other members of the network 32 acquire the file either directly from the seed recipients or another network 32 member that has already acquired the file. In this way, the media file is diffused through the network 32 without the need for a central point of download. If a device needing the file is not on the network 32 when the message to acquire the file is sent, the message may be cached until the device comes on the network 32, at which time the device acquires the file from another member of the file-sharing network 32. It is noted that these devices do not necessarily all have to be in the domain of one network 32 operator since the P2P networks can be used across interconnected Internet protocol networks.

Referring back to FIG. 2, block 58 relates to determining a request for the stored data. The request may received by the controller 30 from one of the devices 14-24 or through a secondary source, such as a web-page or other feature, which may offered by the controller 30 or cable operator. For example, a user interface may be provided and associated with the stored data. It may indicate various content groups which may be downloaded from the one or more devices 14-24, such as by a title of the program, movie, or audio associated therewith, as in the case of media files, and/or by a title, version, or other indicator of a patch or code update, as in the case of configuration files. The user interface may be provided through a web-page or other feature, such as through a cable based electronic programming guide (EPG), media on demand (MOD), or VOD system.

Optionally, the user interface may include features for adding advertisements to the desired data. This may allow the customer to select advertisements for inclusion with the data so as to limit charges associated with the use thereof. The user interface may include a feature for permitting the system operator or other third party to select the advertisements and/or a feature for permitting the customer to select the advertisements. The ability of customers to select the advertisements may be advantageous to insure a receptive audience views the advertisements. Optionally, the customer may select a number of advertisements included with usage of the data, such as to receive a greater discount if more advertisements are included.

The request may include a content unique identifier that can be sent back to the controller 30 or service provider. The controller 30 may then provide value to the content by providing contextual information (index and metadata) to describe and play out the content via a small file download. This contextual information can provide information for things like indexing points for chaptering and insertion points, playlists, links to games, promotional offers, chatrooms, etc. It can also provide tie-ins to time sensitive offers of the content from the service provider. This may allow the service provider to distribute content out of sequence and then provide a playlist to put it back in order. With this link, a service provider can create a tine-sensitive tailored experience (a DVD experience, an interactive experience, an offer experience) for content acquired in a P2P manner.

Block 60 relates to providing retrieval information to facilitate retrieving the data associated with the requested content group. The retrieval information may include the index file, metadata file, and/or other information suitable to facilitate retrieving the data associated with the content group. The retrieval information may include a message, link, or other instructions for coordinating delivery of the requested data to the requesting device.

The retrieval information may be used by the requesting device to contact the storing devices 14-24 for direct download, such as based on addressing information included within the index file. In this manner, the devices 14-24 may coordinate download and assembly of the data from the various devices 14-24 as a function of addressing information included within the retrieval information.

Alternatively, the controller 30 may coordinate delivery of the data to the requesting device. The controller 30 may be configured to direct each of the devices 14-24 having requested data to transmit the requested data to the requesting devices 14-24. The controller 30 may issue unicast or multicast messages to instigate such operation. Using the controller 30 to communicate with the storing devices 14-24, instead of the requesting device, may be advantageous if the requesting device has limited communication capabilities and/or if there are relatively large numbers of storing devices 14-24 from which data is required.

Access to the retrieval information may require information from the requesting device or a user associated therewith. For example, a login or password may be required to access the indexing file, such as to prevent unauthorized users from locating the data. This may be advantageous in preventing pirating and other unauthorized copying of the data, as the individual pieces of segmented data are essentially useless without the other corresponding segments. The withholding of the indexing file in this manner may enhance security.

The metadata file may be withheld in a similar manner to limit usage and to enhance security. As described above, the metadata file may include information related to assembling the segmented data, without which it may be difficult to organize illicitly obtained data. The retrieving device may be required to enter separate security parameters to access the metadata file. Withholding the metadata file in this manner may similarly enhance security. Also, withholding the information allows the value of the service to be retained with the service provider and not distributed with the content.

When a data selection and purchase has been made, data may be retrieved from its distributed storage locations via one of several different "swarming" peer-to-peer applications. In general, swarming peer-to-peer applications allow retrieval of individual chunks of an original file from a distributed storage network 32. These applications allow a single data sink (in this case, the STB/PVR or other device) to receive downloads of different chunks of the original file in parallel from a large number of sources at data rates approaching the provisioned downstream data rate.

The sources selected for data retrieval may be optimized based on a number of criteria, including the type of media to be retrieved, the geographic and topological proximity between data source and data sink, network congestion, and routing costs. These sources may be extended to include any media device with integrated storage provisioned on the cable network 32. Each of the potentially large number devices 14-24 on the network 32 would be tasked with uploading data at a rate for one second or other similar short interface, thus placing a slight, but easily managed load on the upstream channel of the access network 32.

In order to provide a high-quality media product, it may be desirable to provide the data with a minimum of transcription errors during the file download process. Third-generation P2P protocols may provide several means of protecting the integrity. Since a third-generation P2P system breaks each file into a large number of relatively small chunks, then the problem of maintaining integrity is essentially that of maintaining the integrity of each chunk. The index file that may be used to reassemble the media "knows" the characteristics (name, byte-count, etc.) of each chunk to be downloaded. These characteristics may be enhanced with an appropriate security mechanism such as public-key encryption tied to a digital rights management system. If a chunk from a given source violates any of the characteristic parameters, the P2P software may be structured to reject that particular chunk and request another copy of the chunk from a different source. The storage of redundant copies of each of the chunks (for example, the 16× redundancy of the earlier example) greatly increases the likelihood that an error-free copy of each chunk is available for download. This allows file transfers to be self-correcting.

A second issue of data integrity is the ability of the system provider to insure the allocated data is recoverable in the future, given the relatively constant flux of devices entering and leaving the system. Since the storage of the data is outside of the cable operator's physical control, the operator has little control on the disconnection and reconnection of storage devices 14-24 to the cable network 32. Redundant storage of media chunks distributed widely across an operator's network may provide protection against a catastrophic MOD system failure due to network outages since system outages tend to be localized.

Depending on the swarming peer-to-peer technology used, the operator could enable such features as fast-forward, rewind, pause, and start-in-the-middle. For example, the meta-data file providing the index for the re-assembly of the small component chunks into a copy of the original file could be used to prioritize the retrieval of chunks of data that would be needed first for replay during fast forward, rewind, and start-in-the-middle media replay. Furthermore, if a priority is set on particular chunks (for example, due to fast forward replay) the data source used for retrieval could be prioritized based on network congestion and latency characteristics. While the techniques described in this section are described with respect to the provisioning of conventional video-on-demand, this same technique could be used as a means of distributing specialized audio and video content (e.g. video-on-demand-over-mobile-telephone) to a wide variety of media devices 14-24.

Block 62 relates to the requesting device assembling the data. The assembly may be related to the device organizing or otherwise manipulating the received data for playback. For example, the data may be retrieved in sequential order based on its playback, i.e., portions of a movie associated with the beginning thereof may be requested and assembled for playback before portions toward the end of the movie are downloaded and/or assembled.

If advertisements have been included with the data, the requesting device may be contact the controller 30 or other device for downloading the advertisements and/or the controller 30 may automatically transmit the advertisements thereto. The assembly of the data may further include inserting the advertisements within the content, such as at intervals specified by the insertion list.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of supporting on-demand playback of a program comprising:
    segmenting at least a portion of the program into a sequence of data chunks that must be played serially in an order specified by the sequence to properly playback the program;
    storing the data chunks on at least two storage mediums associated with devices connected to a network of a playback device used to playback the program;
    serially instigating playback of each of the data chunks on the playback device by instructing delivery of the data chunks to the playback device, wherein at least a portion of the data chunks scheduled earlier in the sequence are delivered to the playback device to begin playback prior to at least a portion of the data chunks scheduled later in the sequence being delivered to the playback device; and
    limiting usage of a certain amount of a greater amount of storage available on the devices to storing the data chunks based on contractual commitments specified in contracts of customers associated with the devices.

2. The method of claim 1 further comprising determining an amount to be charged to a purchaser of the program based on a number of advertisements to be shown during playback of the program, wherein the amount is proportional to the number of advertisements to be shown during playback.

3. The method of claim 2 further comprising displaying a user interface on a display associated with the playback device to facilitate selection of the number advertisements by the purchaser and transmission of a message specifying the number of advertisements to a network controller used to instigate playback of the program.

4. The method of claim 2 further comprising storing the advertisements on one or more of the devices and instructing delivery of the advertisements from the one or more of the devices for playback with the program.

5. The method of claim of claim 4 further comprising storing each advertisement on the one or more of the devices without segmenting the advertisements.

6. The method of claim 4 further comprising storing the data chunks on the devices in an encrypted state and the advertisements in an unencrypted state.

7. The method of claim 2 further comprising charging the purchaser such that the amount is always greater than zero and less than full price when at least one advertisement is selected to be shown.

8. The method of claim 2 further comprising determining the amount relative a regular price, the regular price being charged in the event no advertisements are selected for playback, and wherein the regular price is reduced by a fixed amount for each advertisement to set the amount to be charged.

9. The method of claim 8 further comprising issuing the purchaser a credit to be used in purchasing subsequent television programs in the event the number of advertisement selected for viewing is greater than the number of advertisements needed to reduce the amount to zero.

10. The method of claim 1 further comprising automatically transmitting a warning message to customers having less memory available for storing the data chunks than that specified in the contractual commitments.

11. The method of claim 1 further comprising limiting usage of the certain amount by preventing the STB from accepting user inputs from the purchaser that would result in storing data on the certain amount.

12. A method of supporting on-demand playback of television programs comprising:
    segmenting one or more of television program into a plurality of data chunks;
    identifying settop boxes (STBs) having an allotted amount of space for storing the data chunks, the allotted amount of space for each STB being determined from contractual commitments made by associated subscribers;
    identifying a current amount of space available on each STB for storing the data chunks, the current amount of space including space already being used to store data chunks and excluding space already being used by the subscriber;
    identifying a first group of STBs where the current amount of space is at least equal to or greater than the allotted amount of space, thereby identifying STBs having free space available for storing additional data chunks;
    identifying a second group of STBs where the current amount of space is less than the allotted amount of space, thereby identifying STBs not having free space available for storing additional data chunks;
    storing at least a portion of the plurality of data chunks on the STBs within the first group according to available free space;
    transmitting a message to each STB in the second group, the message requesting the associated subscriber to increase the current amount of space available for storing the data chunks to at least equal the allotted amount of space; and
    upon receiving a request from a requesting one of the STBs to instigate playback of a requested one of the segmented television programs, coordinating transmission to the requesting one of the STBs of the plurality the data chunks from each of the STBs being used to store one or more of the data chunks of the requested television program.

13. The method of claim 12 further comprising transmitting the message to one or more of the STBs within the first group in the event free space available on one or more of the STBs to store data chunks is subsequently used by the associated subscriber to store other data to an extent that the current amount of space decreases below the allotted amount of space.

14. The method of claim 12 further comprising controlling the STBs within the first group to prevent the STB from using the allotted amount of space for storing data other than data associated with data chunks.

15. The method of claim 12 further comprising, in the event the current amount of space available for storing additional data chunks is increased on one more of the STBs within the second group, preventing the STBs from using the increased space to store data other than data associated with data chunks.

16. The method of claim 12 further comprising, within each message, identifying data to be deleted from the receiving STB upon expiration of a grace period unless additional space is freed to store data chunks, the additional space being at least equal to a difference between the current amount and the allotted amount.

17. The method of claim 12 further comprising specifying a fee increase within each message, the fee increase indicated a fee to be charged to the associated subscriber on top of a subscription fee agreed to within the subscriber agreement if the subscriber fails to increase the current amount of space to at least equal the allotted amount of space.

18. The method of claim 17 further comprising determining the fee increase to be proportional to a difference between the allotted amount of space and the current amount of space.

19. The method of claim 12 further comprising determining a price to be charged for playback of the requested one of the television programs prior to transmitting the data chunks to the requesting STB, and thereafter, limiting access to the requested one of the television programs until the associated subscriber agrees to pay the price.

20. The method of claim 19 further comprising decreasing the price in proportion of a number of advertisements watched by the associated subscriber.

21. The method of claim 20 further comprising determining the number of advertisement watched by the associated subscriber based at least in part on advertisements scheduled to be shown during playback.

22. The method of claim 20 further comprising determining the number of advertisement watched by the associated subscriber based at least in part on advertisements previously watched by the associated subscriber prior to playback.

23. The method of claim 20 further comprising decreasing the price relative a regular price, the regular price being a cost charged to the purchaser in the event that no advertisements are scheduled to be shown during playback, and wherein the decreasing of the regular price is by a fixed amount for each advertisement scheduled to be shown during playback.

24. The method of claim 23 further comprising issuing the purchaser a credit to be used in purchasing subsequent television programs in the event the number of advertisement selected for viewing is greater than the number of advertisements needed to reduce the amount to zero.

25. The method of claim 20 further comprising determining the number of advertisement according to user inputs received while generating the request used to by the requesting one of the STBs to request the requested one of the television programs.

26. The method of claim 12 further comprising limiting access to the requested one of the television programs by allowing only partial playback, the partial playback allowing viewing of a beginning of the television program and preventing viewing of an ending of the television program until the associated subscriber agrees to pay the price.

27. The method of claim 26 further comprising detecting the associated subscriber aggress to pay the price upon selection of a certain number of advertisement to be shown during playback and subscriber viewing of a certain number of advertisements prior to playback.

28. The method of claim 12 wherein the STB is included as part of a mobile phone, a personal video recorder (PVR), a computer, a satellite television receiver, a media terminal adaptor (MTA), or an Internet Protocol (IP) compatible device.

29. A method of supporting playback of media comprising:
    identifying media available from a source for playback by subscribers, each subscriber having a contractual agreement with the source to pay a fee for playback of the media;
    associating a device used to support playback of the media with each of the subscribers, the device having two-way electronic communication capabilities and a memory for storing data;
    based on information specified within the contractual agreement, identifying subscribers that agreed to allocate at least a portion of the memory on the associated device to store data for the source;
    storing copies of at least a portion of the media available from the source on the memories of the devices of the subscribers that agreed to allocate at least a portion of the memories to store data for the source;
    issuing one or more credits to each of the subscribers associated with the devices storing media for the source, each credit having an equivalent monetary value that may be used to reduce the fee charged for playback of the media;
    in response to receiving a request, coordinating transmission of media specified in the request to a requesting one of the devices for playback, the transmission of media including transmission of at least a portion of the media from one or more of the devices storing media for the source;
    charging the subscriber issuing the request the fee associated with playback of the requested media; and
    in the event the charged subscriber elects to redeem one or more credits, reducing the fee charged to the subscriber for playback of the media by an amount of the one or more redeemed credits.

30. The method of claim 29 further comprising issuing the subscriber one or more additional credits if the subscriber agrees to watch one or more advertisements, the one or more additional credits having an equivalent monetary value that may be used to reduce the fee charged for playback of the media.

31. The method of claim 30 further comprising providing a user interface through which the subscriber to selects the advertisements to be watched.

32. The method of claim 31 further comprising transmitting the advertisement to be watched to the device of the subscriber prior to transmission of the requested media.

33. The method of claim 32 further comprising requiring the subscriber to watch a portion of the advertisements before transmitting the request media content to the device for playback.

34. The method of claim 31 further comprising scheduling the advertisements to be watched in cooperation with the transmission of the requested media such that the advertisements are watched during playback of the requested media and not before.

35. The method of claim 29 further comprising issuing the one or more credits in proportion to an amount of space given by the subscribers to the source for storing data, whereby more credits are given as the amount of space increases.

36. The method of claim 29 further comprising issuing one credit for a first amount of memory and multiples of the one credit for each multiple amount of the memory agreed to by the subscriber to be used by the source for storing data.

37. The method of claim 29 further comprising determining the fee specified in the contractual agreement from user inputs received while the subscribers coordinate transmission of the request.

38. The method of claim 29 further comprising issuing instructions to the devices storing media for the source that prevent usage of the portion of the memory that is to be used to store data for the source.

39. The method of claim 29 further comprising, in the event the memory available to store data for the source is less than the amount agreed to in the contractual agreement, issuing a message to the associated subscribers that requests an increase in the amount available memory to at least equal the amount agreed to in the contractual agreement.

40. The method of claim 39 further comprising automatically deleting data included on the memory of the subscriber devices that fail to free the amount of memory specified within the message within a predefined period of time.

* * * * *